United States Patent [19]

Steenburgh

[11] 4,285,383
[45] Aug. 25, 1981

[54] ADJUSTABLE VEHICLE SCREEN

[76] Inventor: Ronald L. Steenburgh, 662 Bellaire St., Peterborough, Canada, K9J 3Y6

[21] Appl. No.: 956,474

[22] Filed: Nov. 22, 1978

Related U.S. Application Data

[63] Continuation-in-part of Ser. No. 848,105, Nov. 3, 1977.

[51] Int. Cl.³ ................................................. E06B 9/06
[52] U.S. Cl. .................................... 160/374; 160/377; 160/105
[58] Field of Search ............... 160/104, 105, 216, 226, 160/227, 228, 230, 372, 373, 374, DIG. 7, DIG. 9, 377; 126/202

[56] References Cited

U.S. PATENT DOCUMENTS

| | | | |
|---|---|---|---|
| 1,825,538 | 9/1931 | Pace | 160/230 |
| 1,881,037 | 10/1932 | Vuchetich | 160/DIG. 7 |
| 1,914,228 | 6/1933 | Woodruff | 160/105 |
| 1,952,055 | 3/1934 | Burcham | 160/374 |
| 2,768,682 | 10/1956 | Smiraldo | 160/372 |
| 2,869,634 | 1/1959 | Bourgoin | 160/105 |
| 3,359,968 | 12/1967 | Thulman | 126/202 |

Primary Examiner—Kenneth Downey
Attorney, Agent, or Firm—Robert D. Farkas

[57] ABSTRACT

An adjustable vehicle screen utilizes a telescoping frame having a slot disposed in the innermost surface thereof so as to permit an elastic-like screen member to have the marginal edges thereof pass therein. The free edges of the screen are captured within the tubular telescoping frame. The frame may be dimentional so as to accommodate various window openings in motor vehicles by allowing the screen to expand or contract in size in conformity therewith. One embodiment of the invention utilizes a pair of hinges joining together a pair of U-shaped frame members so as to permit the screen element to be folded up when not used. Such U-shaped frame members each have telescoping components thereby permitting the apparatus to adjust in size for various window openings. A portion of the frame is provided having a protrusion extending outwardly therefrom so as to be installed within the groove located in the frame of the vehicle in which the uppermost edge and the side edges of the window may reside. The lowermost region of the frame portion is provided having a channel therein adapted to receive the uppermost regions of the glass window of the vehicle, when the glass window is in a retracted position. The protrusion portions and the groove portion serve to maintain the frame securely in the window opening when the screen is thus installed therein.

10 Claims, 10 Drawing Figures

ADJUSTABLE VEHICLE SCREEN

This application is a Continuation-in-part of prior U.S. Application Ser. No. 848,105, filed Nov. 3, 1977.

BACKGROUND OF THE INVENTION

1. The Field of the Invention

This invention relates to adjustable vehicle screens and more particularly to that class adapted to conform to various vehicle window openings.

2. Description of the Prior Art

The prior art abounds with automobile window screens. U.S. Pat. No. 2,869,634, issued on Jan. 20, 1959 to L. P. Bourgoin discloses a window screen having a pair of portions adapted to reside in a fixed frame wherein each portion is slidably affixed to the frame in overlying relationship, similar to a double hung window. The Bourgoin apparatus requires that the frame be constructed to exactly conform to the window opening of the vehicle and thus requires that such frame be tailored to fit only one window size opening.

U.S. Pat. No. 2,704,121 issued Mar. 15, 1955 to W. A. Maidhof et al discloses a frame-like opening to which is slidably affixed a screen having a rigid frame portion surrounding the screen. The uppermost region of the frame is provided having a flat-like protrusion adapted to reside within the uppermost portion of the track normally housing a closed window. The lowermost region of the frame is provided having a groove in which the window portion of the apparatus resides thereby facilitating in storing the apparatus within a window opening of a motor vehicle by firstly engaging the protrusion in the uppermost groove portion of the window opening and then raising the lowered window so as to engage the groove of the Maidhof invention.

U.S. Pat. No. 1,608,785, issued Nov. 30, 1926 to R. W. Evans describes a duplex sliding screen apparatus having a spring-like sheet extending downwardly from the lowermost regions thereof whose free ends are disposed inwardly towards one another adapted to engage an upright member. The uppermost region of the frame supporting the duplex sliding screen elements, is provided having a protrusion adapted to engage with a groove. Such device may be utilized for purposes of screening a window opening of a motor vehicle if desired. However, the Evans apparatus, as well as the Bourgoin apparatus and the Maithof device, each fail to describe a screening element adapted to be convertible in size so as to be used in various openings of various motor vehicles.

SUMMARY OF THE INVENTION

A primary object of the present invention is to provide an adjustable vehicle screen whose overall dimensions may be adjusted to conform to various window openings found in motor vehicles.

Another object of the present invention is to provide an adjustable vehicle screen which may be utilized in a folded up condition when not in use in the motor vehicle.

Still another object of the present invention is to provide a vehicle screen in which one screen portion may slide relative to the other screen portion thereof whilst both screen portions may be adjustable in size to accommodate window openings of various dimensions.

Yet another object of the present invention is to provide an adjustable vehicle screen whose frame elements are telescoping in nature, thereby facilitating easy adjustment and accommodation to window openings of various dimensions.

A further object of the present invention is to provide their telescoping elements having substantially simplified cross sections so as to decrease the cost of construction of the overall apparatus.

Still a further object of the present invention is to provide an adjustable vehicle screen having no metallic components thereby eliminating rusting problems.

Yet a further object of the present invention is to provide a vehicle screen which may be easily installed and removed from a window opening of a motor vehicle.

Heretofore, vehicle screens have been employed each having a frame-like portion, rigid in nature and devoid of any adjustability to accommodate various size openings in the same vehicle or suitable for use in a variety of vehicles having different window openings. The prior art fails also to provide an adjustable vehicle screen that may be folded up or which may be adapted to have screen elements that slide parallel to one another. The present invention contemplates this set of deficiencies and provides a simple inexpensive apparatus which may be installed in a wide range of window openings with great ease, utilizing the window receiving groove of the motor vehicle and the uppermost edge of the glass window portion of the motor vehicle to clasp the screen to the vehicle, simultaneously permitting the screen to adjust itself in size so as to conform to the overall opening of the window when most of the glass window is retracted within the vehicle body. The same compressibility characteristics of the frame and screen portion is utilized in a hingable two part frame embodiment, as well as in a slidable two part screen apparatus which may be opened without removing the sliding screen embodiment from its installed position within the window opening. This is accomplished utilizing an expansible screen element and a telescoping frame in which the screen element has the marginal edges thereof engaged passing through a slot defining the interior perimeter of the frame. Thus, when the frame is collapsed or located in an expanded position, the screen accommodates its size thereto due to the nature of the weave of the screen. A pair of hinges may be utilized to join together two U-shaped frame members so as to make up an adjustable vehicle screen that may be folded when the apparatus is not in use, thereby occupying a small compact space. In likewise fashion a pair of U-shaped members may be slidably affixed to one another, each being capable of being telescoped, such that each supports a screen element disposed partially juxtapose. Thus, the individual screen elements act as a duplex window screen which may have one or the other screen element slide past in the installed position in the vehicle opening.

These objects as well as other objects of the present invention, will become more readily apparent after reading the following description of the accompanying drawings.

DESCRIPTION OF THE PREFERRED EMBODIMENT

Figure 1:
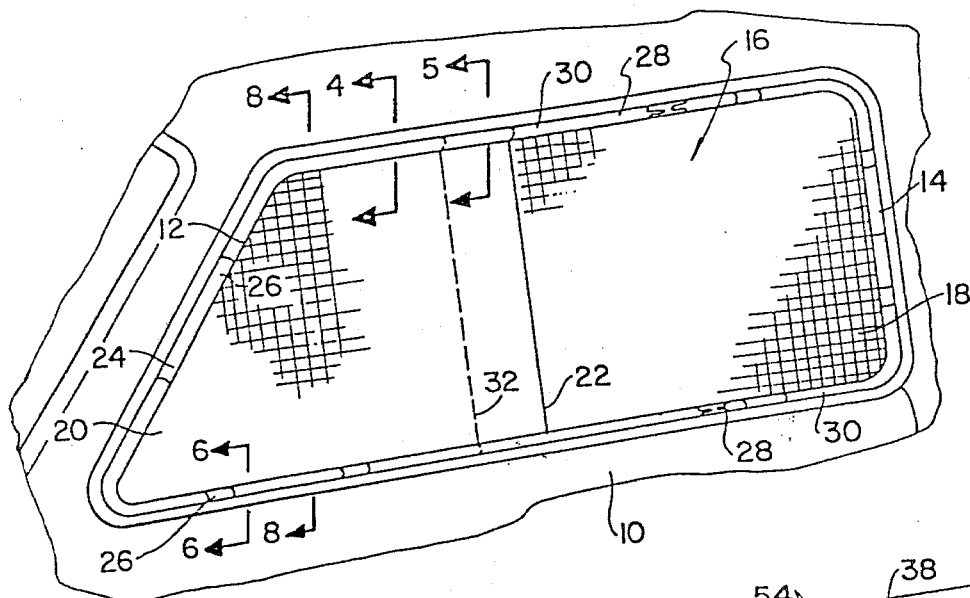
FIG. 1 is an elevation view of one embodiment of the present invention shown installed in a vehicle opening.

The structure and method of fabrication of the present invention is applicable to a tubular-like frame member comprising a series of telescoping portions so as to make up a closed frame. The interior perimeter of the closed frame is provided having an elongated slot therein. Such slot resides within a plane extending parallel to outermost regions of the tubular element making up the frame. A screen, preferably fabricated from a plastic material, such as polyamide, is utilized having the free edges of the screen passing through the slot and residing within the generally tubular-like frame elements. Such free edges have a dimension greater than the width of the slot so that the edges of the screen may not pass outwardly from the confined position within the interior of the generally tubularly shaped elements of the frame. This is accomplished by having the free edges of the screen either molded so as to have such greater dimension or so as to be woven capturing a plastic flexible element adjacent the ends of the screen, such as plastic bead-chain or rope. The screen cloth itself is fabricated from a plurality of interwoven spirally wound monofilaments. Such spirals are interleaved in vertical columns having each turn engaging turns of adjacent columns. By prestressing the plastic material, the screen may be extended or retracted in height in similar fashion to compressing or expanding the length of a helical spring. The screen also may be caused to extend or contract in size in a horizontal direction by having a helical turns assume an elliptical shape when the screen is expanded horizontally and a more nearly circular shape when the screen is permitted to assume its contracted-most shape. The screen elements, consisting of each of the coil-like multi-turn elements, disposed in side by side adjacent relationship, such as to have each turn of each spiral or coil-like element engaging an adjacent turn, of an adjacent element, may be compressed in width by having the longitudinal axes of adjacent elements disposed closer to one another, by simply permitting such interlocking adjacent turns to disengage from one another, from touching engagement, so that the longitudinal axes of adjacent elements are brought closer together. Thus, when the screen is collapsed, in a direction transverse to the longitudinal axes of the elements, the screen may occupy a very minimal dimension. When each or some of the coil-like elements are elongated or compressed, upon the application of opposed forces to the ends of such coil-like elements, the screen may have its height increased or decreased substantially. Thus, the screen may be extended in height or width, over a wide range of surface areas, by elongating the elements' length, along the longitudinal axes of some or all elements and by deforming the circular-like shape of each of the turns, thereby stretching the distance that separates the longitudinal axes and adjacent elements. Alternatively, the screen may have its surface area diminished substantially by an application of opposed forces in transverse directions to the longitudinal axes of each of the coil-like elements where the individual turns, interlocking together adjacent coil-like elements, are nested more closely together, thereby decreasing the width of the screen or by deforming the circular nature of the screen turns, thereby increasing the width of the screen. Naturally, the screen may be expanded in width from a fully nested position, when the screen width is minimal, to a greater width screen, without distorting the circular nature of each turn of the coil-like shape of each element by simply allowing the material comprising each turn to come into touching engagement with the closest turn in an adjacent coil-like element. The opposed forces which cause the screen to change its height, extending along a line parallel to each of the longitudinal axes of the elements, are at right angles to the opposed forces which may be applied to the screen elements so as to shift the longitudinal axes, further or closer apart, thereby affecting the width of the screen. In this fashion, the screen may be independently selectively changed in height and in width or may be simultaneously adjusted so as to have overall greater width and height dimension or a lesser height and width dimension. Further, because the screen elements are so constructed, the frame, disposed about the screen need not be rectangular. The frame may have a shape that has three or more sides, none of which are parallel to one another, if desired. Each of the elements comprising the frame, may be hingably secured to one another or telescopically secured to one another or both, thus, permitting all the screen elements to be identical in shape and size accommodating a frame whose dimensions and shape may be adjusted to suit the application to which the apparatus is best suited.

In one embodiment, the tubular elements comprising the frame are telescoped one over the other in alternate relationship such that the frame may expand in the horizontal direction as well as the vertical direction when the plane defining the frame is maintained in a vertical position. Thus, the frame and the screen carried thereby may be made expansible or contractible in any direction. Generally speaking, such frame may be made rectangular in shape so as to accommodate rectangular window openings of motor vehicles. For those motor vehicles having a ramped edge of the window opening, the frame shape may be provided having one side ramped to accommodate such openings.

An alternate embodiment of the present invention utilizes a pair of U-shaped frame members, each of which possesses telescoping elements as above described. The end of each U-shaped frame portion are joined together utilizing a joining plate whose ends are pivotally secured to the U-shaped frame portions. Thus, such U-shaped portions may be folded parallel to one another because the screen element is capable of being easily bent about one of the rows of spirally wound elements comprising it.

An alternate embodiment utilizes one U-shaped frame member having an expansible screen portion engaged within the slot located in the interior surface of the frame. One marginal edge of the screen is permitted to extend free of the frame joining the free ends of the legs of the U-shaped frame. The other U-shaped frame is adapted to slide upon the legs of the first U-shaped frame and is similarly provided with an expansible screen element. Both screen elements have the free edges thereof disposed in overlying relationship with one another thereby enabling one frame to slide relative to the other. The second frame portion has the slot utilized to capture the screen associated therewith of finite length. Thus, such second frame portion permits the screen to move only in a limited sense horizontally and limited sense vertically when such frame portion is collapsed or extended in the vertical direction and in the horizontal direction.

In all the embodiments abovedescribed, the uppermost outermost edges of the frame elements and the outermost edges of the vertical or near vertical portions of the frame are providing having a protrusion extending outwardly therefrom each residing in the same plane defining the location of the screen elements. Such protrusion is adapted for insertion within the slot normally carrying the closed window of the vehicle. The lowermost portion of the frame, defining each of the embodiments of the present invention, is provided having a groove extending inwardly from the outermost lowermost surface of the frame. Such groove is compatible in size with the uppermost edge of glass portion of the window of the vehicle. Accordingly, when it is desired to install any embodiment of the present invention into a window opening of a motor vehicle, the protrusion portions are "snapped" into the glass receiving groove of the frame of the vehicle and the uppermost edge of the glass portion of the motor vehicle is raised upwardly so as to engage the groove in the lowermost edge of the frame. The frame is thus captured into a locked position. The telescoping portions of the frame will automatically accommodate to the size of the opening, utilizing some manual adjustment to position such frame elements outwardly and upwardly thereby substantially residing along the innermost edges of the vehicle window opening. If desired, spring elements may be disposed within the frame so as to cause the frame to be biased in an expanding position, both horizontally and vertically, as required. The frame element may be fabricated from a rigid plastic material, such as polyurethane, or the like.

Now referring to the figures, and more particularly to the embodiment illustrated in FIG. 1 showing a motor vehicle 10 in which frame portion 12 and frame portion 14 is installed within a window opening 16 thereof. Screen portion 18 is shown partially residing behind screen portion 20 whose marginal edge 22 extends outwardly from the exterior surface of screen portion 18. Frame element 12 is shown having telescoping members 24 and 26 alternately disposed along the length thereof. U-shaped frame portion 14, is also provided with telescoping members, designated 28 and 30. Dotted line 32 represents the free edge of screen portion 18, disposed behind screen portion 20.

Figure 2:
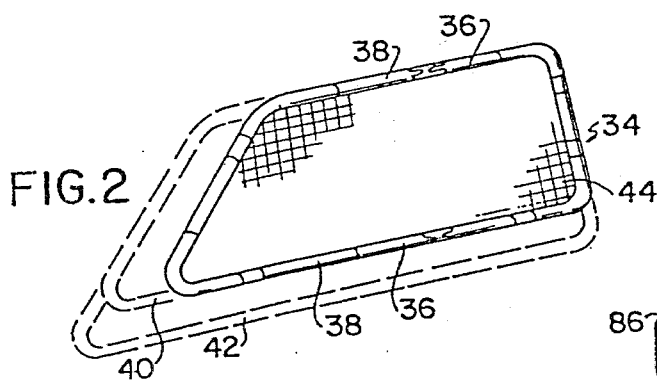
FIG. 2 is an elevation view of another embodiment of the present invention.

FIG. 2 illustrates an alternate environment of a frame 34 comprising telescoping members 36 and 38 extending alternately about the length of frame 34. By virtue of the telescoping elements 36 and 38, frame 34 may be positioned so as to expand in size, depicted by dotted lines 40 and dotted lines 42. Screen element 44 is expansible and contractible in character by virtue of the weave, well known in the art, utilized to fabricate screen 44.

Figure 3:
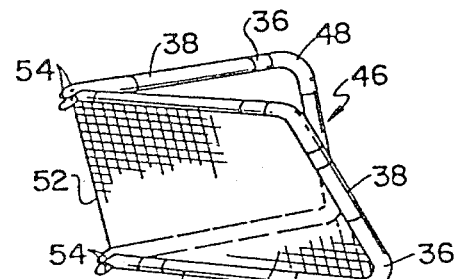
FIG. 3 is a perspective view of still another embodiment of the present invention.

FIG. 3 illustrates still another embodiment of the present invention 46 utilizing screen element 44, therein. Alternate telescoping elements 38 and 36 comprise U-shaped frame portion 48 and substantially U-shaped frame portion 50. U-shaped portions 48 and 50 are joined together along line 52 utilizing hinge members 54 therefor.

Figure 4:
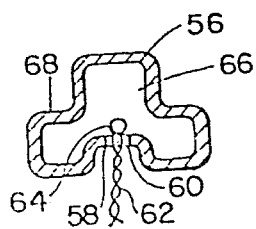
FIG. 4 is a side elevation cross sectional view, taken through line 4—4, viewed in the direction of arrows 4—4 of the embodiment illustrated in FIG. 1.

FIG. 4 illustrates the cross sectional view of horizontal portion of frames 12 and 14 and the near vertical portions of such frames, shown in FIG. 1, and the horizontal and near vertical portions of frame 34 and 46 shown in FIGS. 2 and 3, representing the uppermost horizontal regions thereof. Protrusion-like portion 56 extends upwardly from such horizontal portions and outwardly from such vertical or near vertical portions and is provided with groove 58 in which a portion 60 of screen 62 extends. Free end 64, of screen 62 is shown having an enlarged size, relative to groove 60, achieved as by weaving a flexible rope element within the end strands of such screen, or as by capturing portions of the length of a bead-chain therein. Cavity 66 extends along the length of frame portions 68 such that bulbous portion 64 may be confined therein. Screen 62 is free to slide along the length of groove 60 as required.

Figure 5:
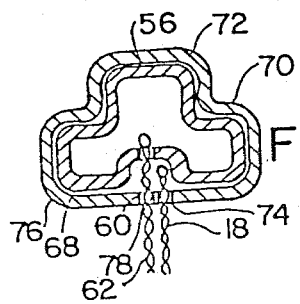
FIG. 5 is a side elevation cross sectional view taken along 5—5, viewed in the direction of arrows 5—5 of the embodiment illustrated in FIG. 1.

FIG. 5 illustrates a frame portion 68, as shown in FIG. 4, covered by frame portion 70, having a protrusion portion 72, similar in shape but somewhat larger than the shape of protrusion portion 56. Screen 62, equivalent to screen 20, shown in FIG. 1, is shown residing within groove 60. Screen 18 is shown residing within groove 74 extending parallel to groove 60. Thus, frame portion 70 is free to slide relative to frame portion 68, each carrying screen portions 18 and 62 respectively. Screen portion 18 may slide alongst groove portion 74 only for the length of groove 74. Such groove, does not extend along the entire length of the horizontal portion of frame 14. Such is the case because the material defining groove 74 is not continuous in nature. If desired, frame portion 70 may be extended alongst dotted lines 76 thereby permitting groove 74 to extend along the entire length of frame portion 70. Thus, screen 18 may move unlimitedly alongst the length of groove 74. When frame 70 is provided having a portion depicted by dotted lines 76, groove 78 is provided within the portion depicted by dotted lines 76 so as to accommodate the passage there through of screen portion 62.

Figure 6:
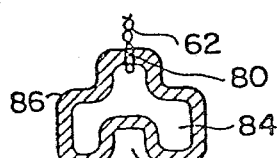
FIG. 6 is a side elevation cross sectional view, along line 6—6, viewed in the direction of arrows 6—6 of the embodiment illustrated in FIG. 1.

FIG. 6 illustrates the cross sectional view, in side elevation fashion, of the lowermost horizontal regions of the apparatuses depicted in FIGS. 1, 2 and 3 having screen portion 62 extending upwardly and outwardly through groove 80. Groove 82 is shown extending inwardly into cavity 84 so as to facilitate the insertion of the uppermost regions of a glass window, not shown, thereinto. When such apparatus, identified by numeral 86, is utilized in the embodiment illustrated in FIG. 1, frame portion 14, comprises a shape somewhat larger than frame portion 86 configured in substantially the same shape and extending there around as to provide support for screen portion 18, shown in FIG. 1. A clearance slot or groove, must be provided in such frame, not shown, so as to accommodate the passage there through of screen portion 62, simulating screen portion 20, shown in FIG. 1.

Figure 7:
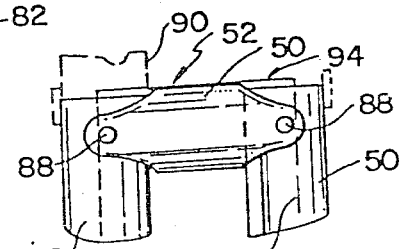
FIG. 7 is a plan view of a portion of the apparatus illustrated in FIG. 3.

FIG. 7 illustrates frame portion 48 and frame portion 50, as shown in FIG. 3, having joining element 50 pivotally secured utilizing rivots 88 therefor. Dotted lines 90 simulate the position occupied by frame portion 50 when such portion resides in the same plane defining the position of frame portion 48. Screen element 44, shown in FIG. 3, extends in the positions shown by dotted line 92. Line 94, shown in dotted lines, depicts the folded up portion 52 of screen 44, shown in FIG. 3, when frame portions 48 and 50 are disposed in substantially parallel relationship to one another.

Figure 8:
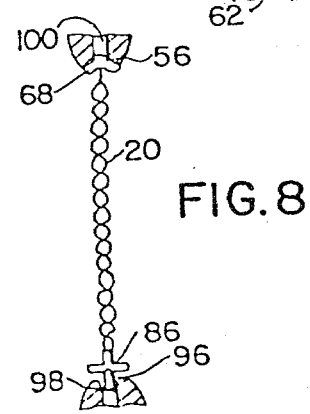
FIG. 8 is a side elevation cross sectional view taken along line 8—8, viewed in the direction of arrows 8—8 of the embodiment illustrated in FIG. 1.

FIG. 8 illustrates frame portion 86, shown in FIG. 6, engaged to the topmost edge 96 of window 98 of the vehicle shown in FIG. 1. Frame portion 68, is shown having protrusion portion 56 engaged within window receiving groove 100 of the vehicle shown in FIG. 1. Screen portion 20 is shown stretching between frame portion 86 and frame portion 68. It should be specifically understood, that screen portion 20 is typical of the screen portions depicted as numerals 18, as shown in FIG. 1 and screen portions 44 as shown in FIGS. 2 and 3.

Figure 9:
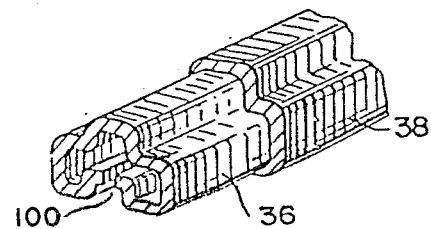
FIG. 9 is a perspective view of a portion of the apparatus illustrated in FIG. 1, adjacent line 5—5.

FIG. 9 illustrates typical telescoping portions 36 and 38, as shown in FIGS. 2 and 3, equivalent to telescoping portions 28 and 30, as shown in FIG. 1 and telescoping portions 68 and 72, as shown in FIG. 5. Here, the outermost telescoping portion 38, is configured to have an identical shape in so far as the outermost regions thereof are concerned to the innermost telescoping portion 36. Groove 100, shown within inner telescoping member 36, is typical of groove 60, as shown in FIGS. 4 and 5 and is typical of groove 74 as shown in FIG. 5. Such groove extends along the entire length of telescoping element 36 and is mated with an overlying groove disposed within element 38 such that a screen, not shown, passing there through, may freely move along the length of telescoping elements 36 and 38 without obstruction. In likewise fashion, telescoping elements 36 and 38, as shown, may be provided having a cross sectional shape, similar to the shape illustrated in FIG. 6, thereby making up the lowermost horizontal portions of the embodiments illustrated in FIGS. 1, 2 and 3.

Figure 10:
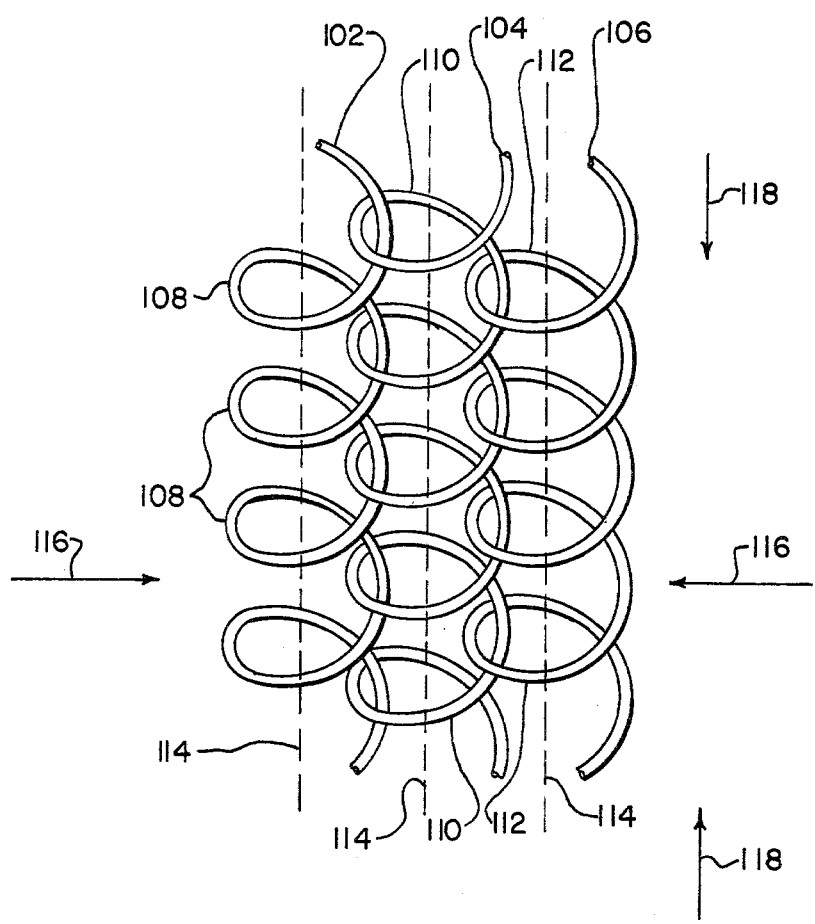
FIG. 10 is a side elevation view of a portion of the screen apparatus, shown in FIGS. 1-3.

Screen elements 102, 104 and 106, shown in FIG. 10, constitute screen portions 18 and 20, as shown in FIG. 1, each being in the shape of a spiral-like, coil-like element fabricated from a metallic material, if desired, or a plastic material, if desired. Turns 108, shown forming screen element 102, are identical to turns 110 and 112, of adjacent elements 104 and 106, respectively. Elements 102, 104 and 106 are interlocked together by having turns 112 engage turns 110 which engage turns 108. Elements 102, 104 and 106 each extend along longitudinal axes, shown by dotted lines 114, shown spaced apart, but parallel to one another. When opposed forces are applied to elements 102 and 106, in the direction of arrows 116, elements 102, 104 and 106 are brought together in closer relationship, so that the individual turns comprising such elements need not necessarily reside in touching engagement with the adjacent turns of adjacent elements. The width of the screen is thence foreshortened. If the opposed forces 116 are reversed in direction and applied to elements 102 and 106, each adjacent turn of adjacent elements come into touching engagement with one another. If such forces are increased, in the directions opposed to arrows 116, each otherwise circularly shaped turns 108, 110 and 112 become distorted and elliptical in shape, thereby further increasing the width of the screen element shown in FIG. 10. Should opposed forces, shown by arrows 118, be applied to the ends of elements 102, 104 and 106, in the direction shown by arrows 118, each of elements 102, 104 and 106 will have the turns comprising same brought closer together. That is, adjacent turns 108, forming element 102, will come closer together. The same would be true for turns 112 and turns 114. The height of the screen is thus foreshortened. Conversely, each opposed forces are applied to screen elements 102, 104 and 106, in a direction opposite to arrows 118, each of the turns comprising each of the elements will be spaced further apart, along longitudinal axes 114, thereby increasing the height of the screen. Should opposed forces by applied in the direction of arrows 116 or 118 to only one end of elements 102, 104 and 106 or to only one or more of such elements, respectively, the screen portion depicted by FIG. 10 need not have its cross sectional area changed in a uniform manner. Thus, upon the application of opposed forces in the direction of arrows 116, at the lower ends of elements 102-106, a triangular shape may be assumed by the elements shown. Alternatively, if forces are applied in the direction of arrows 118 to only element 106, then, an irregular area will be achieved. As can be seen, the screen portion shown in FIG. 10, when applied to the frame elements, shown in FIG. 1, permits screen portion 20 to be fabricated having each of the vertical screen elements, extending parallel to dotted line 32, to be of the same unstressed height, thereby permitting the irregular shaped frame, shown in FIG. 1, to be utilized, if desired.

One of the advantages of the present invention is to provide an adjustable vehicle screen whose overall dimensions may be adjusted to conform to various window openings found in motor vehicles.

Another advantage of the present invention is to provide an adjustable vehicle screen which may be utilized in a folded up condition when not in use in the motor vehicle.

Still another advantage of the present invention is to provide a vehicle screen in which one screen portion may slide relative to the other screen portion thereof while both screen portions may be adjustable in size to accommodate window openings of various dimensions.

Yet another advantage of the present invention is to provide an adjustable vehicle screen whose frame elements are telescoping in nature, thereby facilitating easy adjustment and accommodation to window openings of various dimensions.

A further advantage of the present invention is to provide their telescoping elements having substantially simplified cross sections so as to decrease the cost of construction of the overall apparatus.

Still a further advantage of the present invention is to provide an adjustable vehicle screen having no metallic components thereby eliminating rusting problems.

Yet a further advantage of the present invention is to provide a vehicle screen which may be easily installed and removed from a window opening of a motor vehicle.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. An adjustable vehicle screen comprising a closed frame, said frame being disposed residing in a plane, said frame including a plurality of alternate elongated elements, said elongated elements slidably, telescopingly engaged to one another, a screen, said screen including a plurality of screen elements, each said element having a plurality of circularly shaped turns each disposed having a coil-like shape when there is an absence of forces applied thereto in an outward radial-like fashion, said plurality of elements disposed in side by side parallel relationship adjacent one another, adjacent said elements each having said turns thereof interlocking with each other, wherein each of said turns of said each element may be disposed at selected distances apart from one another along the length of said coil-like shape, means to selectively shorten and lengthen said distances upon first opposed forces being applied to the ends of said plurality of elements, means to selectively shorten and lengthen the distance separating the longitudinal axes of said each of said adjacent elements at selected distances apart when second opposed forces are applied to said adjacent elements, means to dispose said circularly shaped turns into elliptically shaped turns when said second opposed forces are applied to adjacent elements directed away from one another, wherein said first opposed forces are at right angles to said second opposed forces, the marginal edges of said screen slidably engaged and captured from disengagement with said frame, said screen residing within said plane, whereby said frame and said screen may be simultaneously, selectively, independently and concurrently expanded and contracted in the length of said coil-like shape and the distance defined by end most said elements upon the application of said first and said second opposed forces to selective portions of said marginal edges of said screen, wherein said frame and said marginal edges of said screen are configured to be in a closed polygonal shape.

2. The apparatus as claimed in claim 1 wherein said frame comprises a pair of portions, said screen being bifurcated and having each portion thereof affixed to said alternate elongated elements of said pair of portions, said pair of portions slidably affixed to one another, said bifurcated screen portions being partially juxtaposed to one another, a portion of said marginal edges of said each portion of said screen being disposed disengaged and uncaptured by said pair of portions of said frame.

3. The apparatus as claimed in claim 1 further comprising said frame having a pair of bifurcated portions, said bifurcated portions being disposed hingably secured to one another.

4. The apparatus as claimed in claim 1 wherein said frame and said screen are fabricated from a plastic material.

5. The apparatus as claimed in claim 1 wherein said turns of said elements are disposed having a circular shape.

6. The apparatus as claimed in claim 1 wherein a portion of said frame comprises a protrusion extending outwardly from the outer surface of said frame and wherein the remaining portions of said frame include a groove extending inwardly from a lower portion of said frame, said protrusion and said groove residing in said plane.

7. The apparatus as claimed in claim 1 wherein said marginal edges of said screen are confined within a cavity residing in said frame, said cavity located parallel to said plane.

8. The apparatus as claimed in claim 7 wherein said marginal edges of said screen are slidably disposed within said cavity.

9. The apparatus as claimed in claim 1 wherein said frame comprises a pair of marginal edges disposed substantially in parallel spaced apart relationship, another marginal edge, said another marginal edge disposed extending substantially normal to said pair of marginal edges, still another marginal edge, said still another marginal edge extending forming an acute angle to said another marginal edge, said pair of marginal edges and said another marginal edge and said still another marginal edge disposed adjacent to one another.

10. The apparatus as claimed in claim 1 wherein said frame and said screen are disposed having substantially equivalent marginal edges.

* * * * *